United States Patent
Donovan et al.

(10) Patent No.: US 8,793,842 B2
(45) Date of Patent: Aug. 5, 2014

(54) CORD MANAGEMENT SLEEVE

(71) Applicants: Valerie M. T. Donovan, Fredericton (CA); Mario D. Theriault, Fredericton (CA)

(72) Inventors: Valerie M. T. Donovan, Fredericton (CA); Mario D. Theriault, Fredericton (CA)

( * ) Notice: Subject to any disclaimer, the term of this patent is extended or adjusted under 35 U.S.C. 154(b) by 0 days.

(21) Appl. No.: 13/694,167

(22) Filed: Nov. 2, 2012

(65) Prior Publication Data

US 2014/0123438 A1 May 8, 2014

(51) Int. Cl.
*F16G 11/14* (2006.01)

(52) U.S. Cl.
CPC .................................. *F16G 11/14* (2013.01)
USPC ..................... 24/115 R; 24/115 N; 24/131 C

(58) Field of Classification Search
CPC ... F16G 11/14; H01R 13/639; H01R 13/6392
USPC ..................... 24/115 N, 115 R, 131 C, 136 L
See application file for complete search history.

(56) References Cited

U.S. PATENT DOCUMENTS

| | | | |
|---|---|---|---|
| 1,673,704 A | 6/1928 | Palmer et al. | |
| 2,160,961 A | 6/1939 | Dorman | |
| 2,167,541 A | 7/1939 | Young | |
| 2,253,974 A | 8/1941 | Guild | |
| 2,348,975 A * | 5/1944 | Hohwart | 403/214 |
| 2,351,379 A | 6/1944 | Wehringer | |
| 2,429,675 A * | 10/1947 | Eypper | 242/388.1 |
| 2,511,906 A * | 6/1950 | Davis | 403/335 |
| 2,533,341 A | 12/1950 | Alfano | |
| 2,746,112 A | 5/1956 | Simon | |
| 3,068,316 A | 12/1962 | Witt | |
| 3,089,210 A | 5/1963 | Ritter | |
| 3,170,753 A * | 2/1965 | Witte et al. | 439/788 |
| 3,197,830 A | 8/1965 | Hoadley | |
| 3,220,074 A * | 11/1965 | Ehmann | 403/275 |
| 3,310,623 A | 3/1967 | Vaughan | |
| 3,796,304 A | 3/1974 | Blais | |
| 3,924,819 A | 12/1975 | Lapinskas | |
| 3,952,377 A * | 4/1976 | Morell | 24/136 R |
| 4,067,526 A | 1/1978 | Storer | |
| 4,177,542 A * | 12/1979 | Denney | 24/115 R |
| 4,229,924 A | 10/1980 | Teachout, Sr. | |
| 4,285,486 A | 8/1981 | Von Osten et al. | |
| D264,045 S | 4/1982 | Elliot et al. | |
| 4,455,717 A * | 6/1984 | Gray | 24/115 R |
| D275,174 S | 8/1984 | Rolli | |
| 4,721,268 A | 1/1988 | Lerner et al. | |
| 4,784,612 A | 11/1988 | Ryan | |

(Continued)

*Primary Examiner* — Robert J Sandy
*Assistant Examiner* — David Upchurch
(74) *Attorney, Agent, or Firm* — Mario Theriault

(57) ABSTRACT

The cord management sleeve is used to retain an electric cord that is bent in several segments in a bow-tie-like arrangement. The cord management sleeve has a first and second halves, each having a cylindrical shape. The first half is coaxially engaged into the second half, for rotation into the second half. The first half has a circumferential ridge on an end thereof. The second half has a circumferential groove on an end thereof. The circumferential ridge is engaged into the circumferential groove with a sliding fit. Each of the halves has a longitudinal slot therein, and these longitudinal slots are movable relative to each other by rotation of the halves relative to each other, for selectively aligning the slots or setting off an alignment of the slots. The segments of a cord are inserted though the slots and kept in the sleeve by setting off the alignment of the slots.

6 Claims, 2 Drawing Sheets

(56) References Cited

U.S. PATENT DOCUMENTS

| | | | |
|---|---|---|---|
| 4,815,172 A | 3/1989 | Ward | |
| 4,979,614 A | 12/1990 | Ruhaut | |
| 4,991,265 A * | 2/1991 | Campbell et al. | 24/16 PB |
| 5,137,288 A * | 8/1992 | Starkey et al. | 279/42 |
| D346,787 S * | 5/1994 | Cullen | D13/154 |
| 5,312,338 A * | 5/1994 | Nelson et al. | 604/528 |
| D372,420 S | 8/1996 | Mendez | |
| 5,543,582 A * | 8/1996 | Stark et al. | 174/653 |
| D374,174 S | 10/1996 | McClellan | |
| 5,666,699 A * | 9/1997 | Takahashi | 24/115 G |
| D386,670 S | 11/1997 | Phillips | |
| 5,695,365 A * | 12/1997 | Kennedy et al. | 439/638 |
| 5,729,872 A | 3/1998 | Ginocchio | |
| 5,802,676 A | 9/1998 | Tolan | |
| 6,101,684 A | 8/2000 | Ginocchio | |
| 6,206,318 B1 | 3/2001 | Glass | |
| 6,301,752 B1 | 10/2001 | Koppang | |
| 6,339,865 B1 * | 1/2002 | Takahashi et al. | 24/136 R |
| 6,349,452 B1 * | 2/2002 | Cisneros | 24/306 |
| 6,409,179 B1 * | 6/2002 | Daoud | 277/602 |
| 6,425,165 B2 | 7/2002 | Koppang | |
| D464,875 S | 10/2002 | Koppang | |
| 6,460,226 B1 * | 10/2002 | Smith et al. | 24/115 R |
| 6,503,097 B2 | 1/2003 | Archambault | |
| 6,523,229 B2 * | 2/2003 | Severson | 24/16 PB |
| 6,602,087 B1 * | 8/2003 | Carle | 439/369 |
| 6,634,063 B2 | 10/2003 | Joseph | |
| D488,372 S | 4/2004 | Gambrell | |
| 6,793,523 B1 | 9/2004 | Wei | |
| 7,004,786 B1 | 2/2006 | Bloom et al. | |
| 7,214,092 B1 | 5/2007 | Platt | |
| D544,338 S | 6/2007 | Christensen et al. | |
| 7,230,181 B2 | 6/2007 | Simmons et al. | |
| 7,247,799 B2 | 7/2007 | Mori et al. | |
| 7,318,567 B2 | 1/2008 | Mori et al. | |
| D575,632 S | 8/2008 | Morelock | |
| 7,442,067 B1 * | 10/2008 | Amaral | 439/369 |
| D592,039 S | 5/2009 | Okuda | |
| D596,013 S | 7/2009 | Simmons | |
| D599,196 S | 9/2009 | Ruffin et al. | |
| D604,589 S | 11/2009 | Johansson | |
| 7,610,661 B2 | 11/2009 | Sween et al. | |
| D608,628 S | 1/2010 | Knuuttila | |
| D625,582 S | 10/2010 | Cleghorn et al. | |
| D629,671 S | 12/2010 | Ohori et al. | |
| 7,868,250 B2 | 1/2011 | Kolada | |
| 7,882,600 B2 | 2/2011 | Judd | |
| 7,900,971 B2 * | 3/2011 | Chiu | 285/207 |
| D652,710 S | 1/2012 | Yokota et al. | |
| D657,054 S | 4/2012 | Bacon | |
| 8,203,077 B2 | 6/2012 | Honeycutt et al. | |
| 8,209,820 B1 | 7/2012 | Aparbal | |
| 8,245,360 B2 * | 8/2012 | Stafford et al. | 24/136 R |
| 2005/0079751 A1 * | 4/2005 | Decker | 439/369 |
| 2010/0081314 A1 * | 4/2010 | Burr | 439/369 |
| 2010/0192330 A1 | 8/2010 | Walker | |

* cited by examiner

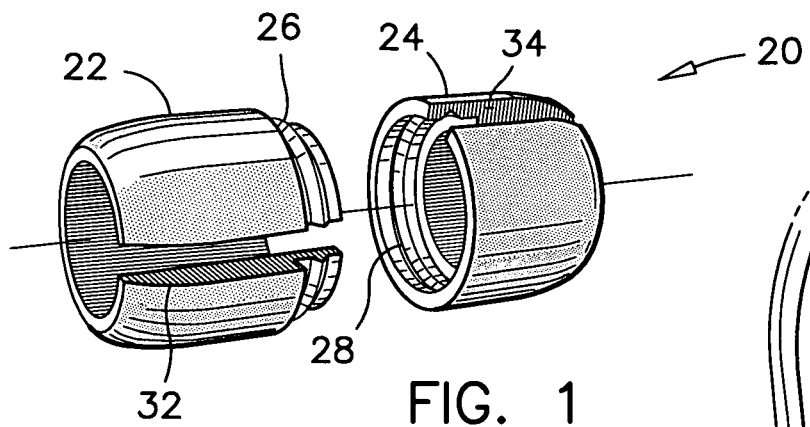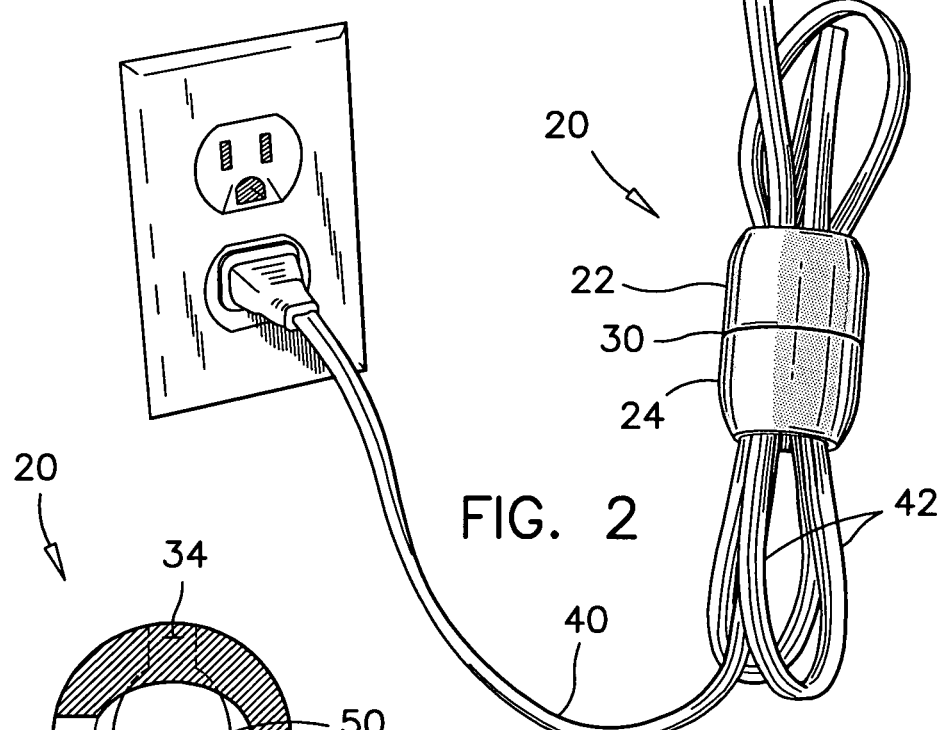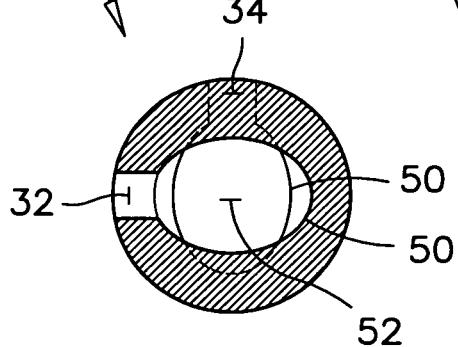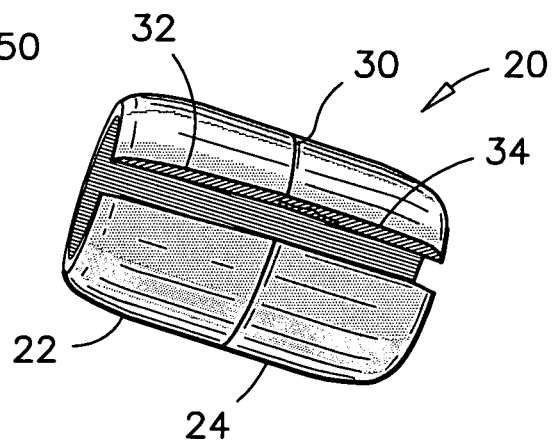
FIG. 1
FIG. 2
FIG. 4
FIG. 3

CORD MANAGEMENT SLEEVE

FIELD OF THE INVENTION

This invention pertains to cord management devices, and more particularly it pertains to devices for use on electric extension cords, computer cables, and cords on appliances and tools, for retaining these cords in a compact and organized arrangement.

BACKGROUND OF THE INVENTION

The disorderly layout of computer cables for example is a sore sight for many people. Stereo and television systems are also encumbered with intertwined cords wherein it is difficult to find out which cord belongs to which module. The same can be said for battery chargers of laptop computers, portable telephones and personal sound systems; for cords of earphones, UBS ports, and for cords of tools and toys of all kind.

Numerous efforts have been made in the past to develop cord management devices. An exceptionally large quantity of cord management devices has been found in the prior art. These devices are illustrated and described in the following documents:

U.S. Pat. No. 1,673,704 issued to J. A. Palmer et al., on Jun. 12, 1928;
U.S. Pat. No. 2,160,961 issued to G. Dorman on Jun. 6, 1939;
U.S. Pat. No. 2,167,541 issued to W. R. Young on Jul. 25, 1939;
U.S. Pat. No. 2,253,974 issued to T. P. Guild on Aug. 26, 1941;
U.S. Pat. No. 2,351,379 issued to H. H. Wehringer on Jun. 13, 1944;
U.S. Pat. No. 2,533,341 issued to G. Alfano on Dec. 12, 1950;
U.S. Pat. No. 2,746,112 issued to P. J. Simon on May 22, 1956;
U.S. Pat. No. 3,068,316 issued to G. Witt on Dec. 11, 1962;
U.S. Pat. No. 3,089,210 issued to C. E. Ritter on May 14, 1963;
U.S. Pat. No. 3,197,830 issued to R. B. Hoadley on Aug. 3, 1965;
U.S. Pat. No. 3,310,623 issued to M. E. Vaughan on Mar. 21, 1967;
U.S. Pat. No. 3,796,304 issued to M. E. Blais on Mar. 12, 1974;
U.S. Pat. No. 3,924,819 issued to E. L. Lapinskas on Dec. 9, 1975;
U.S. Pat. No. 4,067,526 issued to C. K. Storer on Jan. 10, 1978;
U.S. Pat. No. 4,229,924 issued to D. O. Teachout, Sr., on Oct. 28, 1980;
U.S. Pat. No. 4,285,486 issued to J. V. Osten on Aug. 25, 1981;
U.S. Design D264,045 issued to J. M. Elliot et al., on Apr. 27, 1982;
U.S. Design D275,174 issued to E. Rolli on Aug. 21, 1984;
U.S. Pat. No. 4,721,268 issued to L. Lerner et al., on Jan. 26, 1988;
U.S. Pat. No. 4,815,172 issued to C. G. Ward on Mar. 28, 1989;
U.S. Pat. No. 4,979,614 issued to R. C. Ruhaut on Dec. 25, 1990;
U.S. Design D372,420 issued to S. Mendez on Aug. 6, 1996;
U.S. Design D374,174 issued to M. P. MacClellan on Oct. 1, 1996;
U.S. Design D386,670 issued to R. J. Phillips on Nov. 25, 1997;
U.S. Pat. No. 5,729,872 issued to M. H. Ginocchio on Mar. 24, 1998;
U.S. Pat. No. 5,802,676 issued to N. J. Tolan on Sep. 8, 1998;
U.S. Pat. No. 6,101,684 issued to M. H. Ginocchio on Aug. 15, 2000;
U.S. Pat. No. 6,206,318 issued to B. A. Glass on Mar. 27, 2001;
U.S. Pat. No. 6,301,752 issued to S. Koppang on Oct. 16, 2001;
U.S. Pat. No. 6,425,165 issued to S. Koppang on Jul. 30, 2002;
U.S. Design D464,875 issued to S. Koppang on Oct. 29, 2002;
U.S. Pat. No. 6,503,097 issued to F. Archanbault on Jan. 7, 2003;
U.S. Pat. No. 6,523,229 issued to T. L. Severson on Feb. 25, 2003;
U.S. Pat. No. 6,634,063 issued to J. M. Joseph on Oct. 21, 2003;
U.S. Design D488,372 issued to M. G. Gambrell on Apr. 13, 2004;
U.S. Pat. No. 6,793,523 issued to J. Wei on Sep. 21, 2004;
U.S. Pat. No. 7,004,786 issued to S. A. Bloom et al., on Feb. 28, 2006;
U.S. Pat. No. 7,214,092 issued to G. I. Platt on May 8, 2007;
U.S. Design D544,338 issued to M. N. Christensen et al., on Jun. 12, 2007;
U.S. Pat. No. 7,247,799 issued to K. Mori et al., on Jul. 24, 2007;
U.S. Pat. No. 7,230,181 issued to J. W. Simmons et al., on Jun. 12, 2007;
U.S. Pat. No. 7,318,567 issued to K. Mori et al., on Jan. 15, 2008;
U.S. Design D575,632 issued to J. M. Morelock et al., on Aug. 26, 2008;
U.S. Design D592,039 issued to H. Okuda on May 12, 2009;
U.S. Design D596,013 issued to M. L. Simmons on Jul. 14, 2009;
U.S. Design D599,196 issued to C. Ruffin et al., on Sep. 1, 2009;
U.S. Pat. No. 7,610,661 issued to B. Sween et al., on Nov. 3, 2009;
U.S. Design D604,589 issued to B. Johansson on Nov. 24, 2009;
U.S. Design D608,628 issued to O. Knuuttila on Jan. 26, 2010;
U.S. Design D625,582 issued to R. L. Cleghorn et al., on Oct. 19, 2010;
U.S. Design D629,671 issued to T. Ohori et al., on Dec. 28, 2010;
U.S. Pat. No. 7,868,250 issued to P. Kolada on Jan. 11, 2011;
U.S. Pat. No. 7,882,600 issued to B. T. Judd on Feb. 8, 2011;
U.S. Design D652,710 issued to K. Yokota et al., on Jan. 24, 2012;
U.S. Design D657,054 issued to G. S. Bacon on Apr. 3, 2012;
U.S. Pat. No. 8,203,077 issued to J. Honeycutt et al., on Jun. 19, 2012;
U.S. Pat. No. 8,209,820 issued to J. Aparbal on Jul. 3, 2012;
U.S. Patent Application US2010/0192330 filed by E. L. Walker, and published on Aug. 5, 2010.

It is believed that a large portion of the cord management devices found in the prior art did not enjoy a lasting commercial success. Such a low market response to these devices can be attributed to several factors, including complexity, adaptability, appearance and the level of skill required to use them.

It is believed that there is a market need for a cord management device that has a simple construction, that can be understood at a first glance, and that can be used with minimum instruction.

SUMMARY OF THE INVENTION

In the present invention, there is provided a cord management sleeve that is made of two parts with a slot in each part. The slots are aligned with each other to insert segments of a cord in the sleeve. The alignment of the slots is set off for holding the segments of the cord inside the sleeve, so that the cord is held in a compact and orderly manner, in a bow-tie-like arrangement. The segments can then be aligned and pulled along to form loops of equal length so that the bundled cord has a neat and organized appearance.

In a first aspect of the present invention, there is provided a cord management sleeve that has a first and second halves, each having a hollow cylindrical shape. The first half is coaxially engaged into the second half, for rotation into the second half about a common axis. The first half has a circumferential ridge on an end thereof. The second half has a circumferential groove on an end thereof. The circumferential ridge is engaged into the circumferential groove with a sliding fit so that both halves are held to each other end-to-end. Each of the halves has a longitudinal slot therein, and these longitudinal slots are movable relative to each other by rotation of one half relative to the other, for selectively aligning the slots or setting off an alignment of the slots.

This cord management sleeve is easy to understand at a glance so that commercialization can be made with minimum instruction. This cord management sleeve is also easy to use for retaining cords of all sizes and types.

In another aspect of the present invention, there is provided a cord management sleeve wherein the first half is coaxially engaged into the second half without interlocking joint, for rotation into the second half. Each half has a longitudinal slot therein, as in the aforesaid embodiment. This cord management sleeve is easier to manufacture that the first-mentioned embodiment.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Four preferred embodiments of the present invention and variants thereof are illustrated in the accompanying drawings, in which like numerals denote like parts throughout the several views, and in which:

FIG. 1 is a perspective, exploded view of a first preferred embodiment of a cord management sleeve;

FIG. 2 is a perspective view of the first preferred embodiment of the cord management sleeve in use on an appliance cord;

FIG. 3 is a perspective view of the first preferred embodiment of the present invention with the slots in both halves aligning with each other;

FIG. 4 is a cross-section view of the first preferred embodiment of the cord management sleeve, showing a variant in the shape of the opening along the core of the sleeve;

DESCRIPTION OF THE PREFERRED EMBODIMENTS

Figure 5:
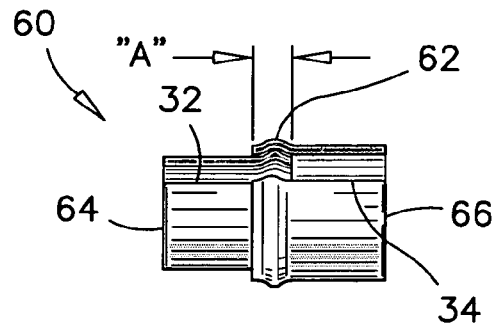
FIG. 5 is a side view of a second preferred embodiment of the cord management sleeve.

Referring to the drawings in FIGS. 1, 2 and 3, the first preferred embodiment of the present invention will be described. The first preferred embodiment of the cord management sleeve 20 is comprised of two hollow cylindrical halves 22, 24 having a same inside diameter. The first half 22 and a circumferential ridge 26 on the end thereof. The other half 24 has a circumferential groove 28 in one end thereof, and the groove 28 has location and dimensions to receive the ridge 26 therein in such a way as to retain both halves 22, 24 together while allowing a rotational movement of each half relative to the other. The groove 28 has shape and dimensions to receive the circumferential ridge 26 therein with a free sliding fit.

The location and dimensions of the ridge 26 and groove 28 are such that when both halves 22, 24 are interlocked with each other, the joint between the halves forms a single circumferential line 30 on the outside surface of the sleeve 20, as shown in FIGS. 2 and 3.

Both halves 22, 24 have a respective longitudinal slot therein. These slots are labelled 32 and 34 respectively. As can be understood, these slots 32, 34 extend throughout the shell of the sleeve 20. These slots 32, 34 have a width to accommodate the thickness of a cord to be inserted in the sleeve 20. When both slots 32, 34 are aligned with each other such as shown in FIG. 3, an electric cord can be inserted in the sleeve 20 one or several segments at the time.

The first preferred cord management sleeve 20 can be made of wood, plastic or metal, according to the choice of the designer and the intended application. A sleeve made of wood for example, can be stained to match the furniture in the room where the sleeve will be used, to enhance the decor of the room.

The exterior appearance of the sleeve according to the first preferred embodiment is a fat look, with a slightly convex side and rounded ends. It is believed that this shape has better visual appeal than the straight tubing shape in the other preferred embodiments presented herein. Other shapes may also be used according to the choice of the designer.

The preferred sleeve 20 is made of a material that has resilience, such that the half 22 with the ridge 26 can be squeezed slightly and inserted in the groove 28 in the other half 24 wherein it expands and remains locked to the other half 24.

Referring now to FIG. 2, the cord 40 is preferably bent in equal segments 42 and inserted one segment at the time into the sleeve 20. The halves 22, 24 are then rotated to set off the alignment of the slots 32, 34 to keep the cord segments 42 captive inside the sleeve, and to maintain the cord 40 in a neat and tidy configuration, as shown in FIG. 2. The segments 42 can be pulled along the axis of the sleeve 20 to form loops of a same length.

Different sleeve sizes are used for different cord sizes and lengths. For example, a first embodiment of the preferred sleeve 20 with a one inch inside diameter can hold 12 strands of a 16-2 AWG extension cord. Similarly, a half-inch inside diameter sleeve can hold 12 strands of a 22-2 AWG cord, such as the cord of a battery charger for a cell phone for example.

When the cord is needed, the slots 32, 34 are realigned and one or more segments 42 are taken out of the sleeve 20 to make up for the length of cord needed. The slots 32, 34 are set off alignment again to hold the remaining segments inside the sleeve 20.

Referring to FIG. 4, the inside diameter of the preferred sleeve 20 needs not be a perfect circle. The inside openings in the halves 22,24 can be oval for example as shown at label 50, with the longer axis of the ellipses aligning with its respective slots 32, 34. When the two halves 22, 24 are rotated relative to each other, the inside opening 52 of the combined halves of the sleeve 20 is much smaller than the ellipse 50, providing a tightening action on the remaining segments inside the sleeve 20.

The elliptical shape of the openings 50 through the sleeve 20 is optional. It has been found that the first preferred cord management sleeve 20 with a circular opening works just as good with 4 strands therein as it does with 12 strands. An electrical cord has a certain degree of resilience, and when the cord 40 is bent and inserted in the sleeve, the resiliency of the cord keeps the segments 42 in frictional contact with the inside surface of the sleeve 20. In fact, the preferred sleeve 20 needs not to be packed full to work as expected.

Referring now to FIG. 5, the second preferred embodiment of the cord management sleeve according to the present invention will be explained.

In this second embodiment, the sleeve 60 can be made of metal tubing and the joint 62 between the halves 64, 66 can be a preformed joint made by common tube expander tools, such as those used for flaring tube ends.

Figure 7:
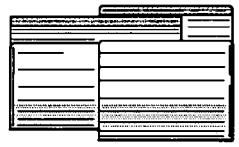
FIG. 7 is a side view of a third preferred embodiment of the cord management sleeve.
Figure 8:
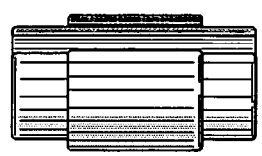
FIG. 8 is a side view of a fourth preferred embodiment of the cord management sleeve.

The overlap "A" between the halves 64, 66 can be any length, as long as both halves are accessible for rotation by finger-grip strength. When this overlap "A" is sufficiently long, such as half the length of one of the halves 64, 66, there is no need for the preformed joint 62. In that context, the third and fourth embodiments 80, 82 illustrated in FIGS. 7 and 8 respectively, with one half partially or entirely overlapping the other, are satisfactorily for obtaining the desired results with smaller sizes of electrical cords, for example.

Figure 6:
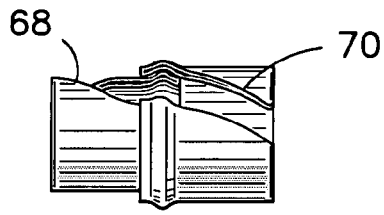
FIG. 6 is a side view of the second preferred embodiment of the cord management sleeve showing a variant in the shape of the slots therein.

Coming back to FIG. 6, the slots 68, 70 in the cord management sleeve 60' can be straight or curved such as in a helix-like form for example. Although a sleeve 60 with helix-like slots might be better to retain all the segments of a cord therein, this type of slot might be more difficult to understand by the general public.

Figure 9:
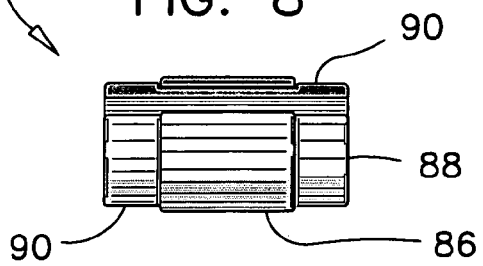
FIG. 9 shows a variant of the fourth preferred embodiment.

FIG. 9 shows a variant 84 of the fourth preferred embodiment 82, wherein the outer half 86 is held centred over the inner half 88 by a pair of raised shoulders 90 on the surface of the inner half 88.

As to further construction details, and other method of use of the cord management sleeve according to the preferred embodiments of the present invention, these details should be apparent to those skilled in the art, and accordingly, further description relative to these aspects is deemed unnecessary.

What is claimed is:

1. A cord management sleeve for retaining juxtaposed segments of a cord together, comprising;
    first and second hollow tubular shells; said first hollow tubular shell having a first entire length and said second hollow tubular shell having a second entire length; said first entire length being longer than said second entire length;
    said second hollow tubular shell being coaxially and movably mounted over a central segment of said first hollow tubular shell such that a first end portion of said first hollow tubular shell extending beyond a first end of said second hollow tubular shell relative to said central segment and a second end portion of said first hollow tubular shell extending beyond a second end of said second hollow tubular shell relative to said central segment; said first end portion being opposite from said second end portion relative to said first entire length of said first hollow tubular shell, and said first end being opposite from said second end relative to said second entire length of said second hollow tubular shell;
    each of said first and second hollow tubular shells having a C-shaped cross-section; a projection of said C-shaped cross-section in said first hollow tubular shell along said first entire length of said first hollow tubular shell being uniform along said first entire length of said first hollow tubular shell, and defining a first slot extending there through, along said first entire length of said first hollow tubular shell, and a projection of said C-shaped cross-section in said second hollow tubular shell along said second entire length of said second hollow tubular shell being uniform along said second entire length of said second hollow tubular shell and defining a second slot extending there through, along said second entire length of said second hollow tubular shell, and
    said first and second slots being movable relative to each other by rotation of said first and second hollow tubular shells relative to each other, for selectively aligning said first and second slots with each other for inserting said juxtaposed segments of said cord inside said first and second hollow tubular shells or for setting off an alignment of said first and second slots relative to each other for securing said juxtaposed segments of said cord inside said first and second hollow tubular shells.

2. The cord management sleeve as claimed in claim 1, wherein said first hollow tubular shell having a raised shoulder relative to an outside surface thereof, on each of said first and second end portions; and said second hollow tubular shell being coaxially and movably mounted astride over said central segment of said first hollow tubular shell between said raised shoulders.

3. In combination, a cord management sleeve and a cord folded in juxtaposed segments with said juxtaposed segments being enclosed in said cord management sleeve; said cord management sleeve comprising;
    first and second hollow tubular shells; said first hollow tubular shell having a first entire length and said second hollow tubular shell having a second entire length; said first entire length being longer than said second entire length;
    said second hollow tubular shell being coaxially and movably mounted over a central segment of said first hollow tubular shell such that a first end portion of said first hollow tubular shell extending beyond a first end of said second hollow tubular shell relative to said central segment and a second end portion of said first hollow tubular shell extending beyond a second end of said second hollow tubular shell relative to said central segment; said first end portion being opposite from said second end portion relative to said first entire length of said first hollow tubular shell, and said first end being opposite from said second end relative to said second entire length of said second hollow tubular shell;
    each of said first and second hollow tubular shells having a C-shaped cross-section; a projection of said C-shaped cross-section in said first hollow tubular shell along said first entire length of said first hollow tubular shell being uniform along said first entire length of said first hollow tubular shell, and defining a first slot extending there through along said first entire length of said first hollow tubular shell, and a projection of said C-shaped cross-section in said second hollow tubular shell along said second entire length of said second hollow tubular shell being uniform along said second entire length of said second hollow tubular shell and defining a second slot extending there through, along said second entire length of said second hollow tubular shell, said first and second slots being movable relative to each other by rotation of said first and second hollow tubular shells relative to each other, for selectively aligning said first and second slots with each other for inserting said juxtaposed segments of said cord inside said first and second hollow tubular shells or for setting off an alignment of said first and second slots relative to each other for securing said juxtaposed segments of said cord inside said first and second hollow tubular shells; and said juxtaposed segments being enclosed inside said first and second hollow tubular shells, with said second slot in said second hollow tubular shell being set off an alignment of said first slot in said first hollow tubular shell for retaining said juxtaposed segments inside said cord management sleeve.

4. The combination as claimed in claim 3, wherein said juxtaposed segments being retained in said cord management sleeve in a bow-tie-like arrangement.

5. The combination as claimed in claim 4, wherein said juxtaposed segments forming loops of equal length.

6. A method of tidying up an electric cord, comprising the steps of;

providing a cord management sleeve comprising;

first and second hollow tubular shells; said first hollow tubular shell having a first entire length and said second hollow tubular shell having a second entire length; said first entire length being longer than said second entire length;

said second hollow tubular shell being coaxially and movably mounted over a central segment of said first hollow tubular shell such that a first end portion of said first hollow tubular shell extending beyond a first end of said second hollow tubular shell relative to said central segment and a second end portion of said first hollow tubular shell extending beyond a second end of said second hollow tubular shell relative to said central segment; said first end portion being opposite from said second end portion relative to said first entire length of said first hollow tubular shell, and said first end being opposite from said second end relative to said second entire length of said second hollow tubular shell;

each of said first and second hollow tubular shells having a C-shaped cross-section; a projection of said C-shaped cross-section in said first hollow tubular shell along said first entire length of said first hollow tubular shell being uniform along said first entire length of said first hollow tubular shell, and defining a first slot extending there through, along said first entire length of said first hollow tubular shell, and a projection of said C-shaped cross-section in said second hollow tubular shell along said second entire length of said second hollow tubular shell being uniform along said second entire length of said second hollow tubular shell and defining a second slot extending there through, along said second entire length of said second hollow tubular shell, and while holding said first hollow tubular shell by one of said end portions, rotating said second hollow tubular shell about said first hollow tubular shell for aligning said first slot in said first hollow tubular shell with said second slot in said second hollow tubular shell;

folding said electrical cord in several juxtaposed segments forming loops of similar lengths, inserting said juxtaposed segments through said first and second slots and into said first and second hollow tubular shells; and while holding said first hollow tubular shell by one of said end portions, rotating said second hollow tubular shell about said first hollow tubular shell for setting off an alignment of said first slot in said first hollow tubular shell from said second slot in said second hollow tubular shell for retaining said juxtaposed segments inside said first and second hollow tubular shells; and pulling on said loops and arranging said juxtaposed segments in a bow-tie-like arrangement inside said cord management sleeve.

\* \* \* \* \*